US00RE39943E

(19) United States
(12) Reissued Patent
Kobussen et al.

(10) Patent Number: US RE39,943 E
(45) Date of Reissued Patent: Dec. 18, 2007

(54) METHOD AND MEANS FOR MAKING COEXTRUDED SAUSAGE STRANDS

(75) Inventors: Jos Kobussen, Indianola, IA (US); Jaap Kobussen, La Veghel (NL); Mart Kobussen, Indianola, IA (US); Vincent Louis Basile, II, West Des Moines, IA (US)

(73) Assignee: Stork Townsend, Inc., Des Moines, IA (US)

(21) Appl. No.: 09/793,245

(22) Filed: Feb. 26, 2001

Related U.S. Patent Documents

Reissue of:
(64) Patent No.: 5,888,131
Issued: Mar. 30, 1999
Appl. No.: 08/960,983
Filed: Oct. 30, 1997

(51) Int. Cl.
*A22C 11/02* (2006.01)

(52) U.S. Cl. ..... 452/30; 425/133.1; 452/35; 426/105

(58) Field of Classification Search ..... 452/27, 452/30, 35, 40; 425/133.1; 426/140, 273, 426/105, 513
See application file for complete search history.

(56) References Cited

U.S. PATENT DOCUMENTS

| | | | | |
|---|---|---|---|---|
| 3,306,754 | A | 2/1967 | Kielsmeier et al. | 99/169 |
| 3,399,423 | A | 9/1968 | Kielsmeier et al. | |
| 3,622,353 | A | 11/1971 | Bradshaw et al. | 99/169 |
| 3,739,427 | A | 6/1973 | Niedecker | 452/35 |
| 3,751,202 | A | 8/1973 | Coleman et al. | 425/133.1 |
| 3,752,618 | A | 8/1973 | Moreland | 8/973 |
| 3,767,821 | A | 10/1973 | Deacon et al. | 426/276 |
| 4,302,489 | A | 11/1981 | Hattori et al. | 452/48 |
| 4,731,906 | A | 3/1988 | Matthews et al. | 452/35 |
| 5,104,349 | A | 4/1992 | Van Der Dungen | 452/51 |
| 5,271,948 | A | 12/1993 | Boni et al. | 426/273 |
| 5,554,401 | A | 9/1996 | Alexander et al. | 426/140 |
| 5,573,455 | A | 11/1996 | Barilli | 452/35 |

FOREIGN PATENT DOCUMENTS

| | | | |
|---|---|---|---|
| EP | 0 720 816 A1 | | 7/1996 |
| EP | 0 741 973 A1 | | 11/1996 |
| GB | 807863 | | 1/1959 |
| GB | 1232801 | | 5/1971 |
| GB | 1288111 | | 9/1972 |
| GB | PCT/GB92/02381 | * | 7/1993 |
| WO | WO 93/12660 | | 7/1993 |

OTHER PUBLICATIONS

"Meat Processing", Feb. 1992, p. 28.
"Sausage Casing Technology", 1974, Park Ridge, NJ, Noyes Data Corp.
"Meat Processing", Feb. 1992, p. 38.*

* cited by examiner

*Primary Examiner*—Thomas Price

(57) ABSTRACT

An extrusion attachment for sausage making machines have three [connection] *concentric* tubes with [the inner tube defining a first passageway,] the space between the inner *restrictor* and [intermediate] *second* tubes comprising a [second] *first* passageway, and the space between the outer *third* tube and the [intermediate] *second* tube defining a [third] *second* passageway. The diameter of the [inner] *restrictor* tube is small so that meat emulsion passing into the [inner] *restrictor* tube is subjected to a higher pressure than that of the pressure in the [second] *first* passageway. The lower pressure meat material in the [second] *first* passageway is thinly coated on the strand of the high pressure meat material extruded from the [inner] *restrictor* tube. A thin layer of collagen material is extruded from the [third] *second* passageway for deposit on the outer surface of the meat layer extruded from the [second] *first* passageway.

12 Claims, 8 Drawing Sheets

46
42
50
12
54
69
56
44
58

METHOD AND MEANS FOR MAKING COEXTRUDED SAUSAGE STRANDS

Matter enclosed in heavy brackets [ ] appears in the original patent but forms no part of this reissue specification; matter printed in italics indicates the additions made by reissue.

BACKGROUND OF THE INVENTION

In the manufacture of sausage strands, the smearing of fat particles on the surface of the sausage is a significant problem in that it substantially detracts from the appearance of the finished product. This is true in conventional sausage making, as well as in coextrusion for making sausage which have been more recently developed. Maintaining the shape of the resulting sausages during cooking has also been difficult.

It is therefore a principal object of this invention to provide a method and means for manufacturing coextruded sausage strands wherein the problem of smearing is essentially eliminated, and where a good appearance of the finished product is achieved wherein substantial portions of lean meat are visible.

A further object of this invention is to provide a method and means for coextruding a sausage strand wherein the shape of the sausage strand will be maintained while the finished product is being handled and is being cooked.

These and other objects will be apparent to those skilled in the art.

SUMMARY OF THE INVENTION

This invention involves a machine that has at least three concentrically located tubes which are spaced apart to provide at least three elongated passageways. Meat is pumped under pressure into the center and intermediate passageway with the center passageway being restricted in diameter so that meat emulsion entering therein, under a pressure of approximately 60 psi, will have a pressure of approximately 200 psi as the meat emulsion is passing therethrough.

A second layer of meat emulsion moves through the intermediate passageway and is under a typical pump pressure of 60 psi. The meat emulsion therein is moved through a restricted channel as it is being extruded to provide a thin layer on the meat emulsion passing through the center passageway. This function compresses the meat particles and places them on the outer surface of the meat emulsion passing from the center passageway. The meat particles are very visible on the outer surface of the meat emulsion strand extruded from the center passageway. Further, the decompression action as the meat emulsion moves out of the center passageway causes the salt soluble proteins to move to the outer layer of the center core of the product to enhance the cohesion of the finished product and to retain its shape during cooking.

An additional passageway is formed concentrically by the outer tube with respect to the center passageway and the first passageway. A thin collagen material is extruded from this second passageway onto the surface of the product described above. This collagen emulsion is then subsequently hardened to provide stiffness and strength to the ultimate product.

The method of the invention contemplates imposing a higher pressure on the center core of the ultimate product through the restrictor tube in the machine; thence compressing the outer meat layer existing at a lower pressure, to compress the meat particles therein to make the meat particles more visible in the final product, thus avoiding smearing of the fat particles. Movement of the high pressure emulsion to a lower pressure causes the salt soluble proteins in the outer layer to enhance the cohesion of the final product to insure that it retains its shape.

DESCRIPTION OF THE PREFERRED EMBODIMENT

Figure 1:
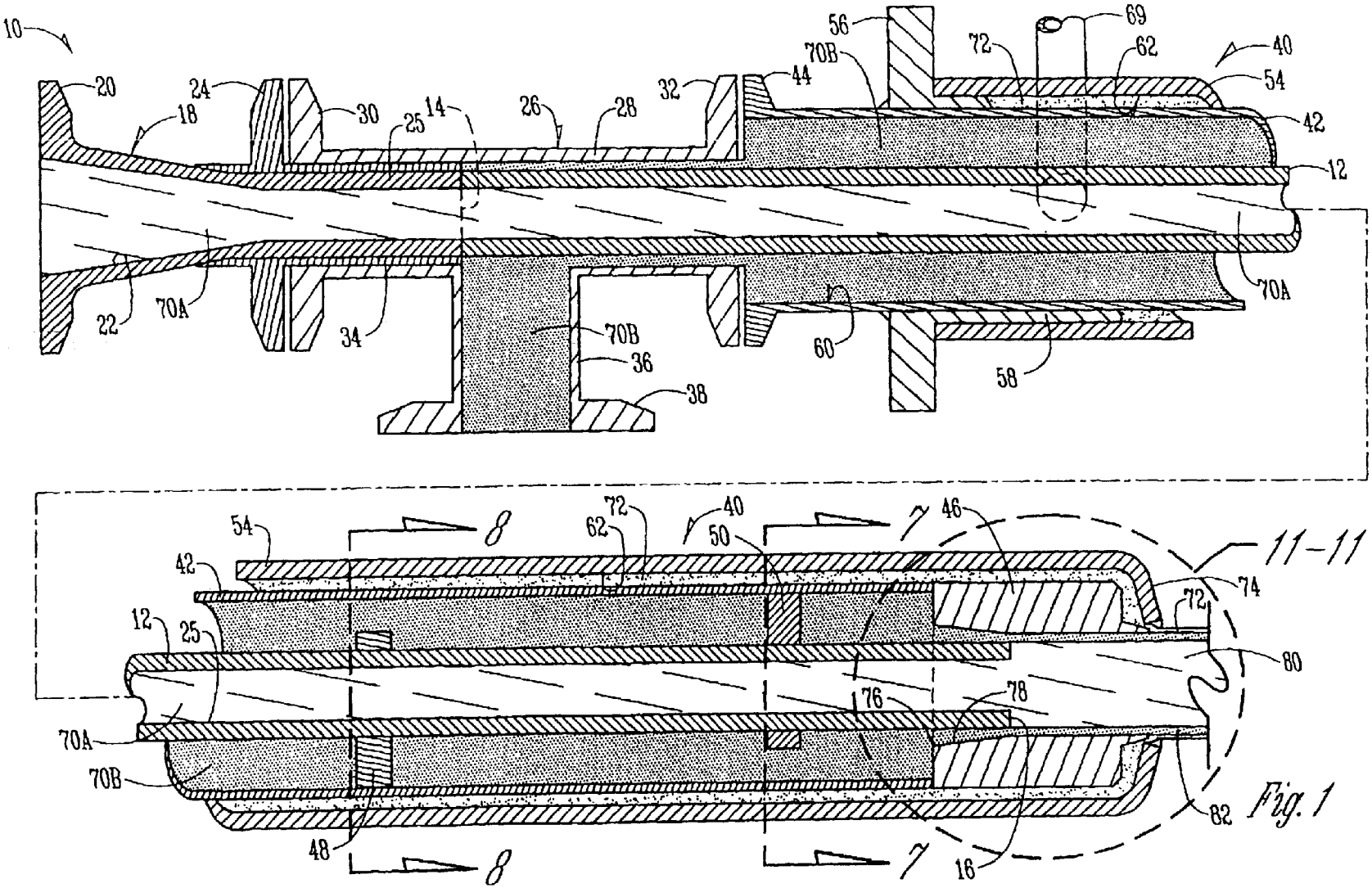
FIG. 1 is a sectional view of the extrusion attachment of this invention as viewed from one side thereof.
Figure 2:
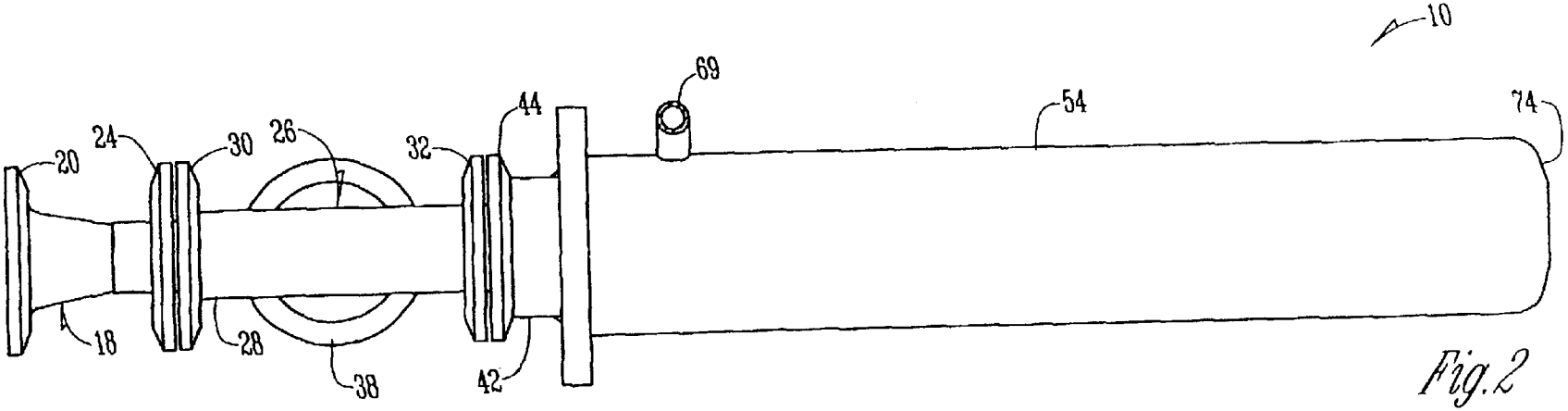
FIG. 2 is a top plan view of the device of FIG. 1.
Figure 3:
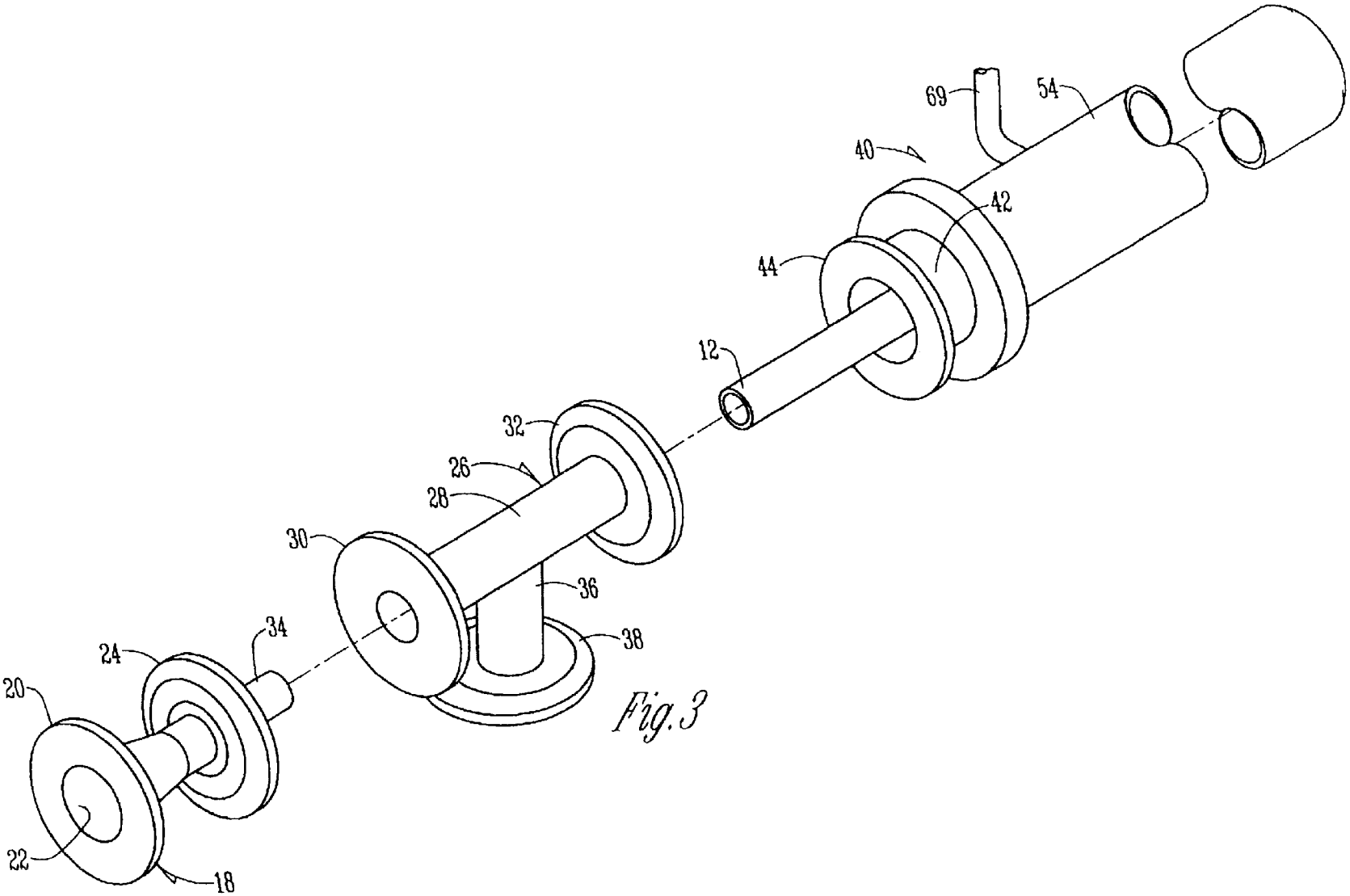
FIG. 3 is an exploded perspective view of the device of FIG. 1.
Figure 4:
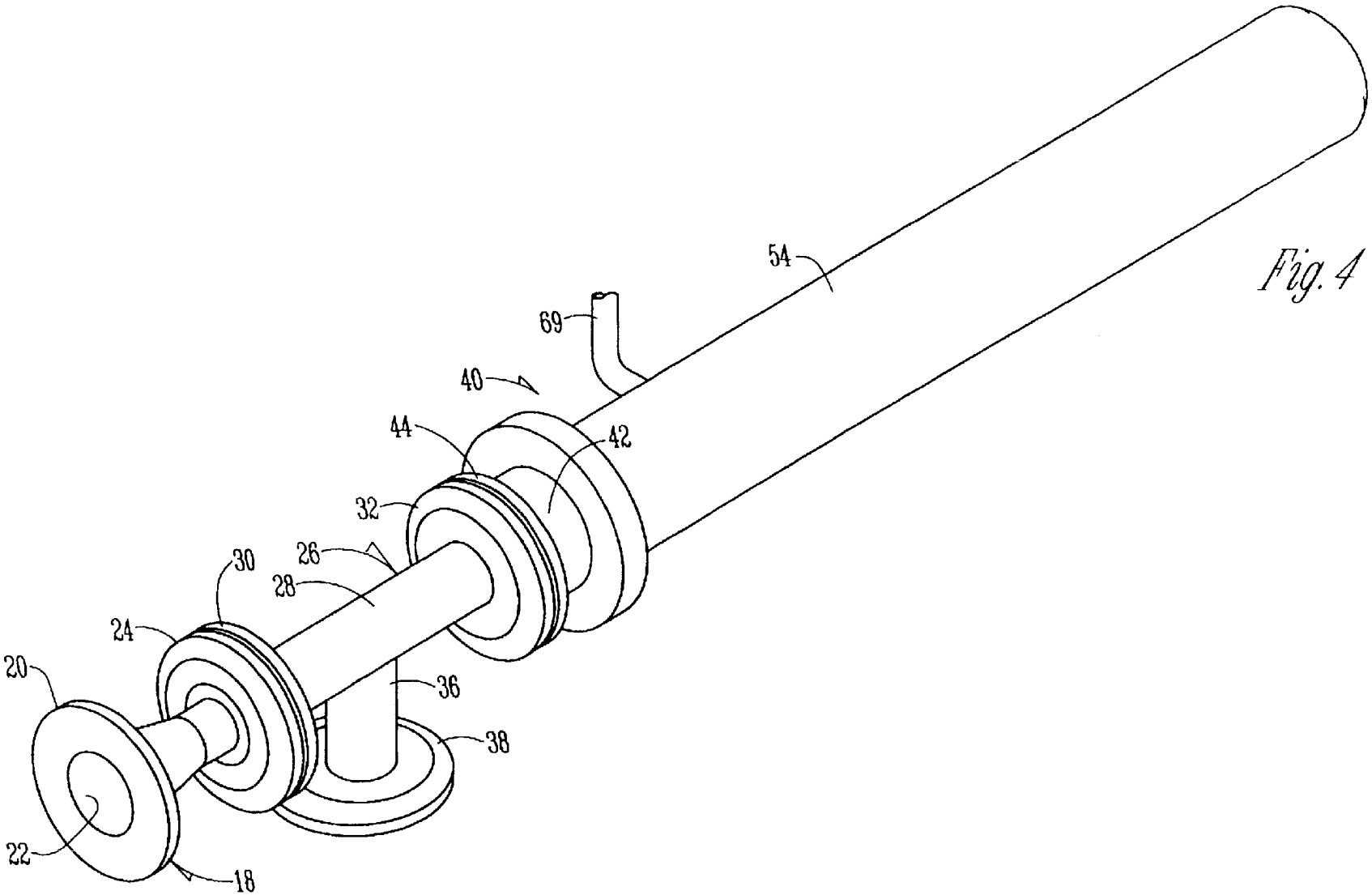
FIG. 4 is a perspective view of the components of FIG. 3 in assembled condition.

The extrusion attachment 10 (FIG. 1) has an elongated restrictor tube 12 which has an intake end 14 and a discharge end 16. An inlet coupling 18 (FIG. 1) has an internally threadable flange 20 on its outer end which is adapted to be connected to a meat emulsion pump as will be discussed hereafter. Coupling 18 has a center tapered bore 22 with a large outer diameter and a narrower inner diameter. A second threaded flange 24, similar to flange 20, is secured to coupling 18 at its inner end as best shown in FIGS. 1 and 3. A hollow tube 25 extends through flange 24 from the inner end of bore 22 (FIG. 3), and abuts end 14 of tube 12.

A coupling 26 has a horizontal hollow sleeve 28 with threaded flanges 30 and 32 secured to opposite ends thereof. Flanges 30 and 32 are similar to flanges 20 and 24 described above. As shown in FIG. 1, flange 30 is adapted for threadable connection to flange 24. As also shown in FIG. 1, the tube 34 on flange 24 extends through suitable apertures in the flanges 24, 30 and in sleeve 28. (The connecting flanges herein are conventional, and the threads on the flanges have not been shown.) A vertical inlet port 36 is in communication with the interior of sleeve 28 and has a threaded flange 38 on the lower end thereof. The flange 38 is adapted for connection to a meat pump as will be described hereafter and is adapted to introduce meat emulsion into the sleeve 28 around the restrictor tube 12 and downstream of the inner end of tube 34.

Figures 5, 6:
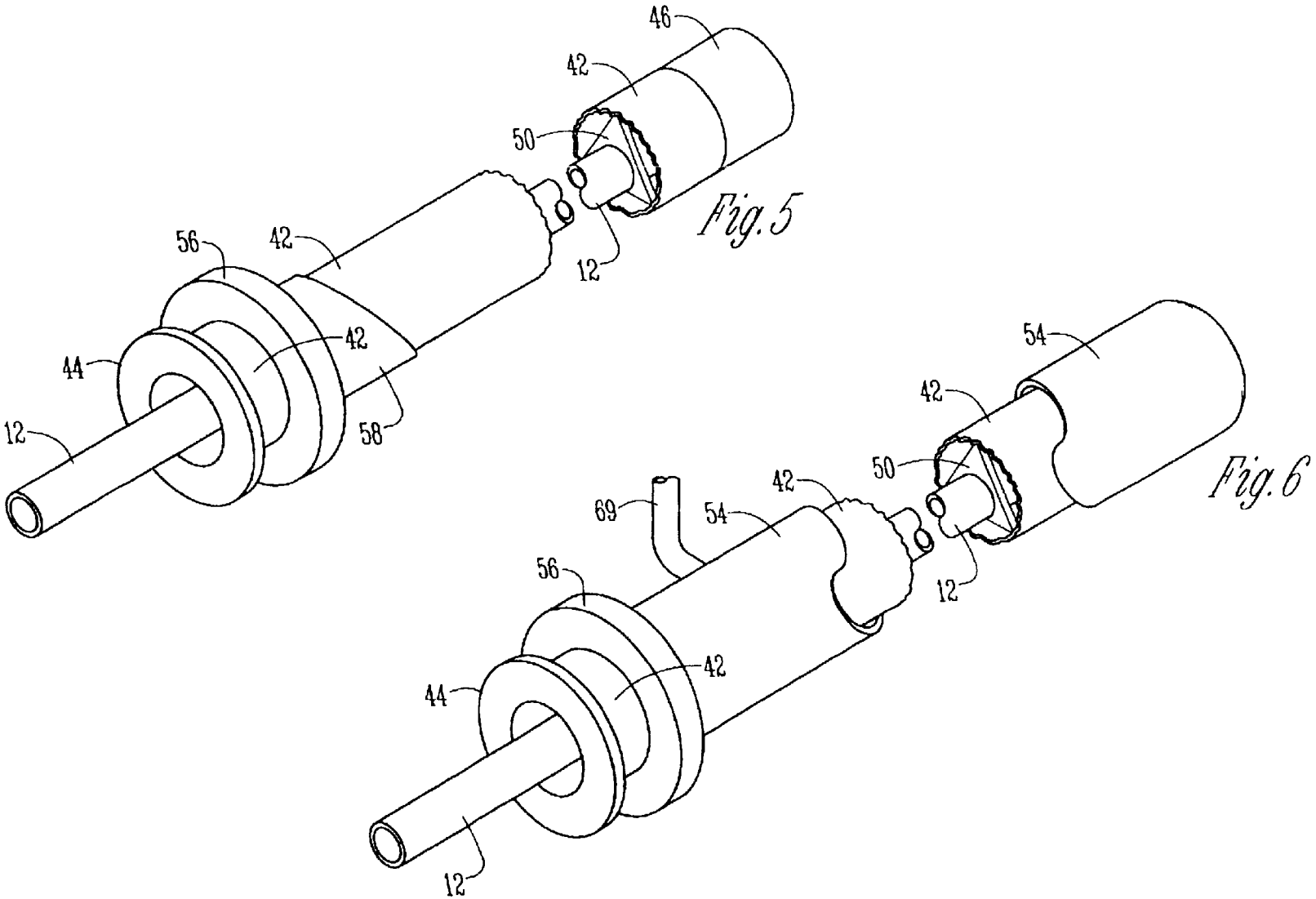
FIG. 5 is a partial perspective view of the extrusion attachment with the outer sleeve or tube removed.
FIG. 6 is a view similar to FIG. 5 but shows the outer sleeve in an assembled condition.
Figure 7:
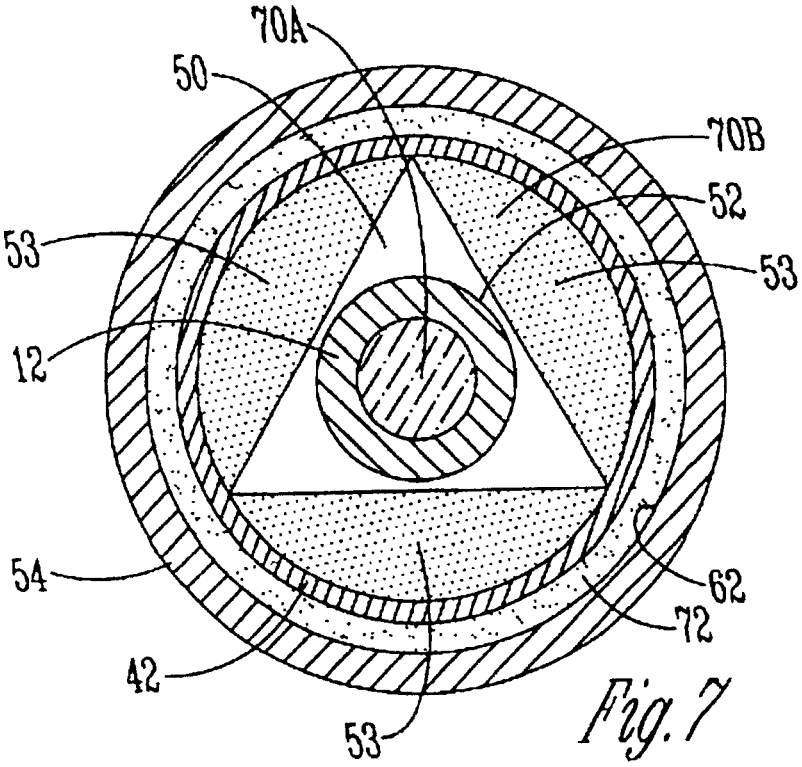
FIG. 7 is a sectional view taken on line 7—7 of FIG. 1.
Figure 8:
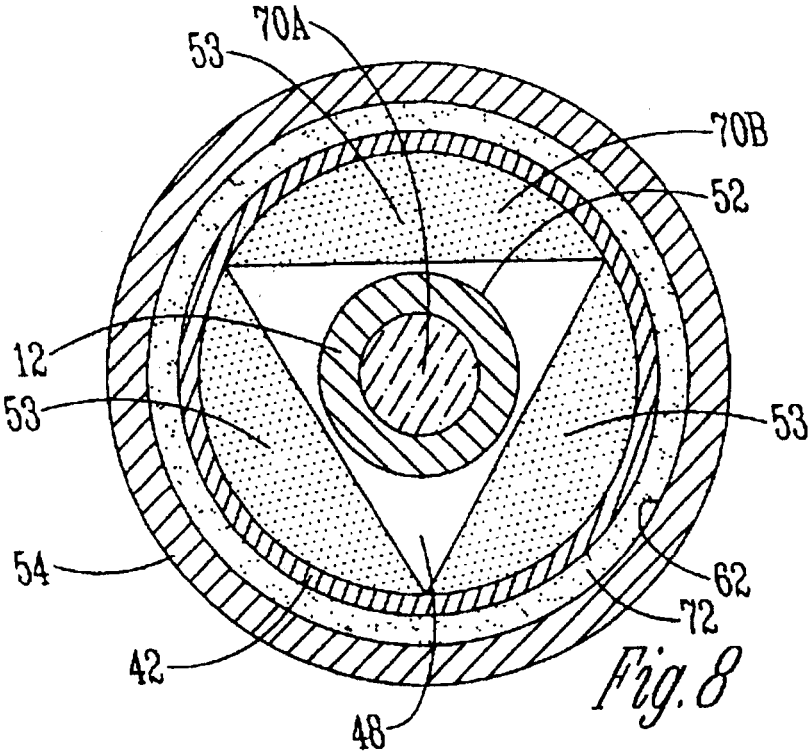
FIG. 8 is a sectional view taken on line 8—8 of FIG. 1.

An extruder body 40 (FIGS. 3 and 6) includes an elongated hollow tube 42 (FIG. 1) which has a threaded flange 44 on one end adapted to be connected to the flange 32 on coupling 26. An outlet port coupling 46 is located on the end of tube 42 opposite to the flange 44 (FIG. 1). Triangular shaped stabilizers 48 and 50 (FIGS. 1, 7 and 8) are mounted around the outer diameter of restrictor tube 12 with the points of the stabilizers bearing against the internal diameter of tube 42. Each of the stabilizers 48 and 50 has a center opening 52 to receive the restrictor tube 12. Meat emulsion, as discussed hereafter, can pass by the stabilizers 48 and 50 within tube 42 by virtue of the spaces 53 shown in FIGS. 7 and 8.

An outer tube 54 is secured to mounting collar 56 which has a suitable aperture therein to receive the outer surface of tube 42. Collar 56 is located on the end of tube 42 adjacent the flange 44. A spacer sleeve 58 has one end abutted against collar 56 and the other end terminating in an angular edge. The outer tube 54 fits over the outer surface of spacer sleeve 58 and is secured thereto.

A first passageway 60 exists between the outer surface of restrictor 12 and the inner surface of tube 42 (FIG. 1). A second space or passageway 62 exists between the inner surface of tube 54 and the outer surface of tube 42. The radial thickness of passageway 62 is defined by the thickness of the spacer sleeve 58.

Figure 9:
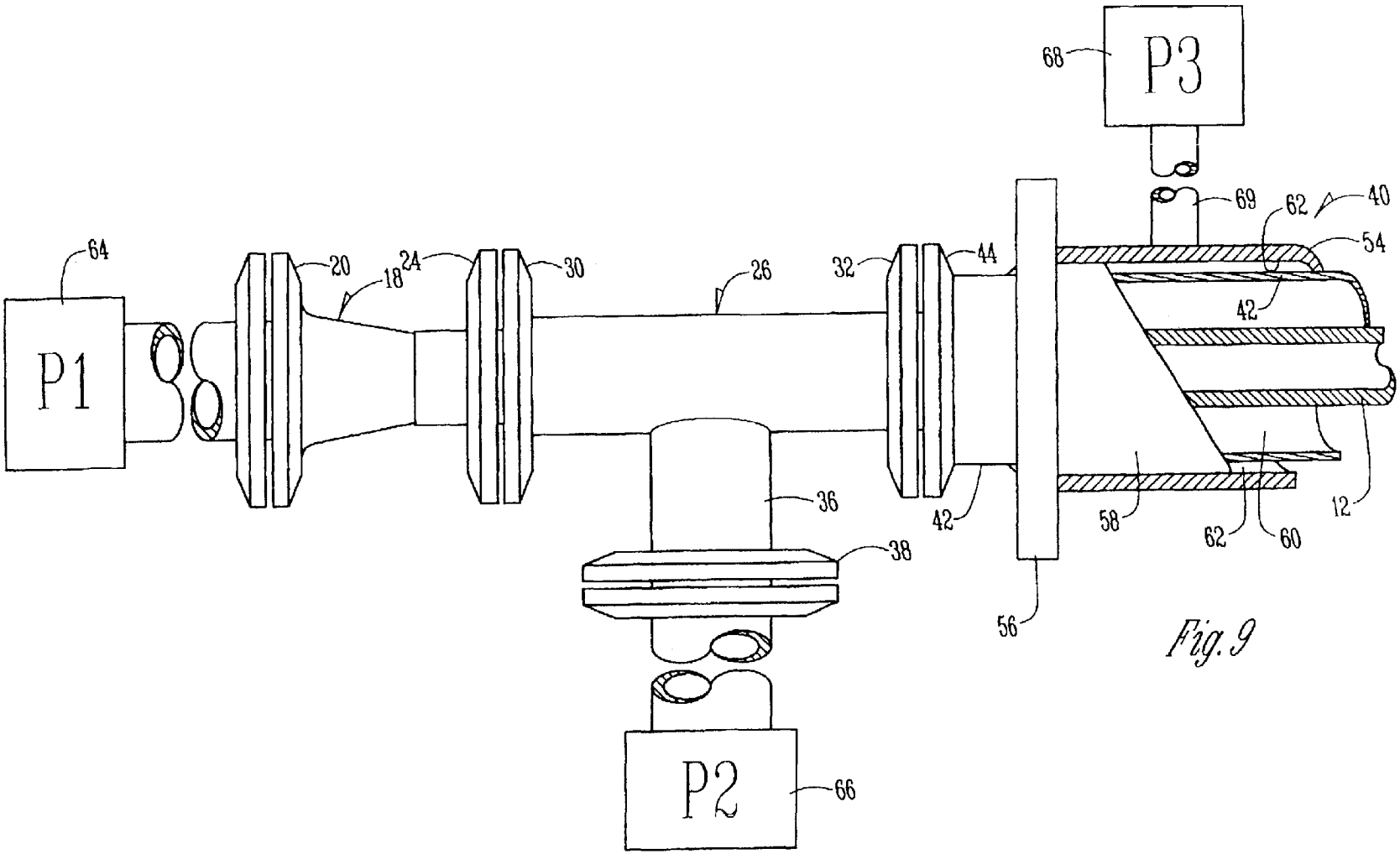
FIG. 9 is a schematic view showing the pump connections to the extrusion attachment.

With reference to FIG. 9, a meat emulsion pump 64 is conventionally connected to inlet coupling 18. Similarly, a meat emulsion pump 66 is conventionally connected to the flange 38 of inlet port 36. Lastly, collagen pump 68 is operatively connected to passageway 62 through tube 69.

In operation, meat emulsion 70A enters coupling 18 under conventional pump pressure of approximately 60 psi. However, as this meat emulsion 70A enters the elongated restrictor tube 12 through coupling 18, the internal pressure thereof rises to approximately 200 psi. Meat emulsion 70B enters port 36 at a conventional pressure of approximately 60 psi and remains at this pressure throughout its longitudinal movement through passageway 60. The meat emulsion 70A and 70B can be of the identical composition, or can be of a different composition or different material.

A collagen material 72 moves through the second passageway 62 where it is diverted by flanges 74 on the downstream end of tube 54 (FIG. 1).

Meat emulsion from a single pump 64 can be pumped into both of the first and second passageways rather than being pumped from separate pumps 64 and 66.

It should be noted that the outlet port 46 has a shearing edge 76 just adjacent the tapered channel 78 (FIG. 1). As the meat emulsion 70B moves through passageway 60, it encounters shearing edge 76 and then moves into the tapered channel 78. The meat particles in meat emulsion 70B are compressed from spherical shaped particles to flattened elliptical particles which serves the purpose of making them more visible on the surface of the inner strand 80 that is extruded from the end of restrictor tube 12 (FIG. 1). The meat emulsion 70B leaves channel 78 and forms a layer 82 of meat emulsion 70B on the strand 80.

Figure 10:
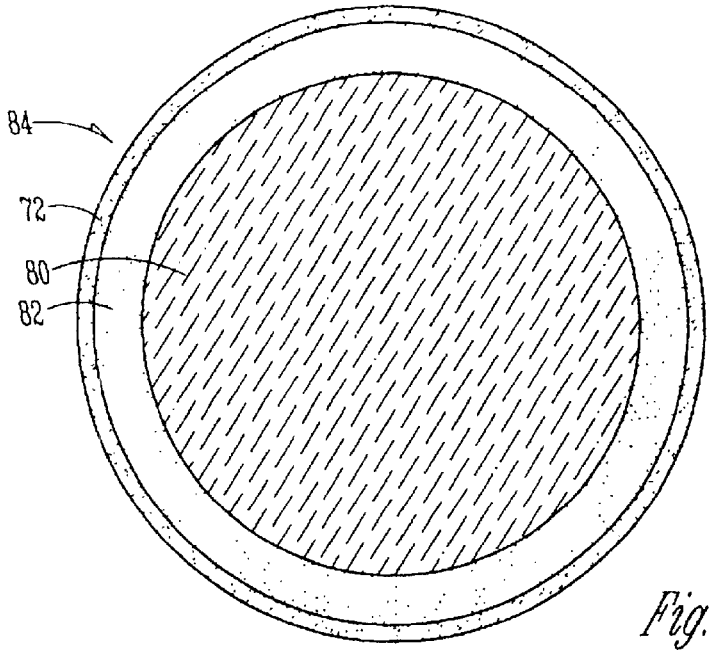
FIG. 10 is a sectional view through the finished strand of this invention.
Figure 11:
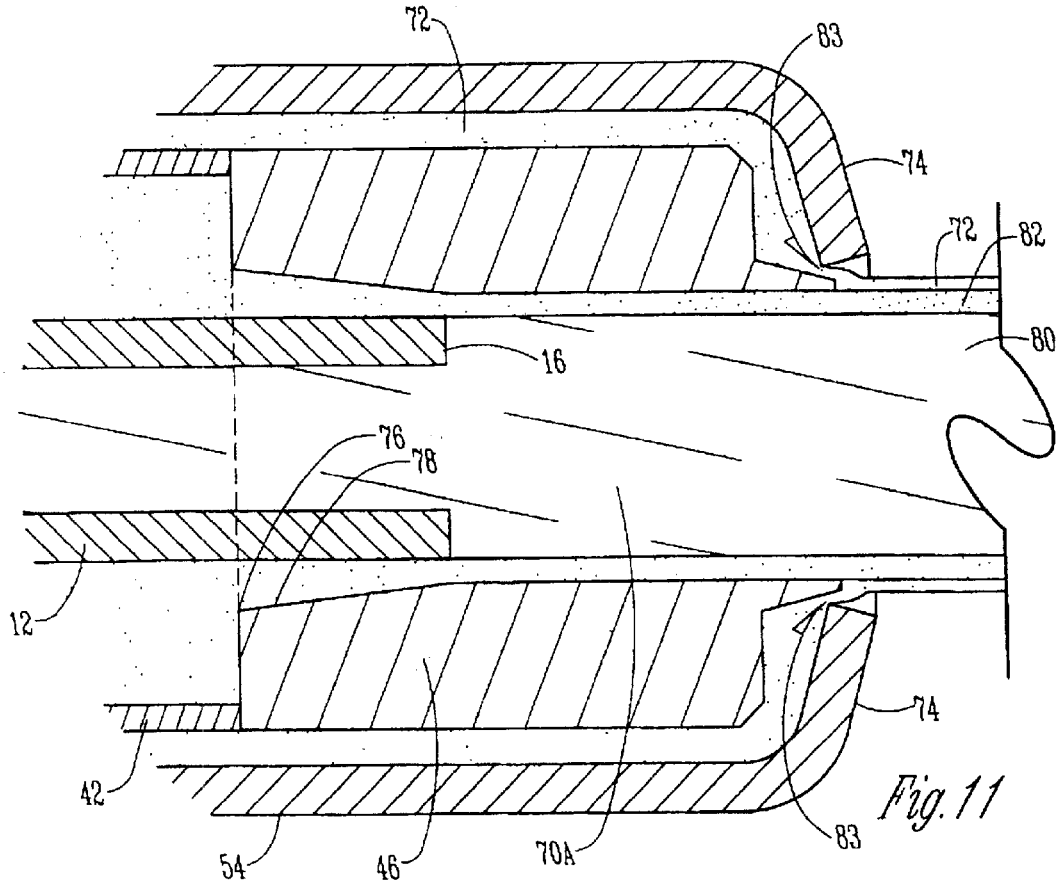
FIG. 11 is an enlargement of the right-hand end of FIG. 1.

The strand 80 coated with a layer of the meat emulsion 82 is then coated with a layer of collagen material 72 which is moved from the second passageway 62 through channel 83 (FIG. 11) onto the layer 82 as the layer 82 and inner strand 80 pass underneath the flanges 74 on the discharge end of tube 54. With reference to FIG. 10, the resulting product 84 is comprised of the inner strand 80 with a thin layer of meat emulsion 82 on the outer surface thereof, and finally, with a thin layer of collagen 72 on the outer surface of the layer 82.

Again, as previously described, the layer 82 of low pressure meat emulsion moving through channel 78 decreases if not eliminates the smearing action that might otherwise take place as the layer 82 is formed. The expansion of the strand 80 as it leaves the discharge end 16 of restrictor tube 12 also enhances the surfacing of the salt soluble proteins in the strand. This activity causes the salt soluble protein to move to the layer 82 to help the cohesiveness of the finished product.

From the foregoing, it is seen that this invention will achieve at least all of its stated objectives.

What is claimed is:

1. An extrusion attachment for sausage making machines, comprising, an inner hollow elongated restrictor tube having an intake and a discharge end, and having a fixed diameter, an inlet coupling secured to the intake end of said restrictor tube and having a bore therein of a greater diameter than the fixed diameter of said restrictor tube and being in communication therewith, an outlet port coupling on the discharge end of said restrictor tube and having a bore therein with a diameter greater than the diameter of said restrictor tube, a second tube concentrically mounted around said restrictor tube and having an inner diameter spaced from an outer diameter of said restrictor tube to create a first passageway therebetween, a third tube concentrically mounted around said second tube and having an inner diameter spaced from the outer diameter of said second tube to create a second passageway therebetween, said inlet coupling and said second tube being connectable to a source of meat emulsion under pressure, said first passageway being of sufficient size that meat emulsion moving therein will maintain a meat emulsion pressure substantially the same as the pressure from said meat emulsion source, said [second] *first* passageway having a narrowed discharge channel surrounding the discharge end of said restrictor tube whereby meat emulsion exiting the [second] *first* passageway will provide a thin layer of meat emulsion around the surface of meat emulsion exiting said restrictor tube, said [third] *second* passageway being connectable to a source of collagen material under pressure and having a narrowed discharge channel adjacent said outlet port coupling to deposit a collagen material layer around the meat emulsion discharged by said restrictor tube and said second tube.

2. The device of claim 1 wherein said inlet coupling and said second tube are connectable to the same source of meat under pressure.

3. The device of claim 1 wherein said inlet coupling and said second tube are connectable to a different source of meat under pressure.

4. The device of claim 1 wherein a shearing edge is located adjacent the discharge channel on said [second] *first* passageway to facilitate the compression of meat particles in meat emulsion passing through said channel.

5. The device of claim 1 wherein tube stabilizer elements are located around said restrictor tube and engaging the inner diameter of the second tube to support said restrictor tube within said second tube and to maintain the restrictor tube and said second tube in concentric relationship.

6. A method of manufacturing a sausage product comprising, extruding a strand of meat emulsion through an elongated restrictor tube at a high first pressure, coextruding a first layer of meat emulsion through a second tube at a lower second pressure which is lower than said first pressure, with said second tube being concentrically positioned and in a spaced position with respect to said restrictor tube so that said first layer is deposited on said strand of meat emulsion.

7. The method of claim 6 wherein said first layer is deposited on said sausage strand in a common space wherein the first layer and the sausage strand are subjected to a lower pressure than said high first pressure, wherein the material in said sausage strand can expand within said space.

8. The method of claim 6 wherein a collagen material layer is deposited on said first layer.

9. The method of claim 6 wherein meat particles in said first layer are compressed before said first layer is deposited on said strand.

10. The method of claim 6 wherein said first pressure is approximately 200 psi and said second pressure is approximately 60 psi.

11. The method of claim 6 wherein said first pressure is at least double that of said second pressure.

12. The method of claim 6 wherein said first pressure is at least triple that of said second pressure.

* * * * *